(12) United States Patent
Albohr et al.

(10) Patent No.: US 7,673,495 B2
(45) Date of Patent: Mar. 9, 2010

(54) METHOD FOR CALCULATING A FRICTION-SLIPPAGE CURVE FOR A TIRE

(75) Inventors: Oliver Albohr, Höchst (DE); Luciano Garro, Bad König (DE); Udo Kuhlmann, Aschaffenburg (DE); Vittorio Peveri, Milan (IT); Bo N. J. Persson, Jülich (DE); Alessandro Pinto, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 1 day.

(21) Appl. No.: 11/663,175

(22) PCT Filed: Aug. 30, 2005

(86) PCT No.: PCT/EP2005/054263

§ 371 (c)(1),
(2), (4) Date: Feb. 13, 2008

(87) PCT Pub. No.: WO2006/032600

PCT Pub. Date: Mar. 30, 2006

(65) Prior Publication Data

US 2008/0250843 A1     Oct. 16, 2008

(30) Foreign Application Priority Data

Sep. 20, 2004   (EP) .................................. 04022339

(51) Int. Cl.
*G01N 3/56* (2006.01)
(52) U.S. Cl. ............................................................ 73/9
(58) Field of Classification Search .................. 73/7–9, 73/146, 126; 701/71
See application file for complete search history.

(56) References Cited

U.S. PATENT DOCUMENTS 4,779,447 A * 10/1988 Rath ................................ 73/9

(Continued)

FOREIGN PATENT DOCUMENTS

DE    101 55 672 A1    5/2003
DE    102 08 998 A1    9/2003

OTHER PUBLICATIONS

Palasantzas, G., "Influence of Self-Affine Surface Roughness on the Friction Coefficient for Rubbers," Journal of Applied Physics, vol. 94, No. 9, pp. 5652-5655, (Nov. 1, 2003).

(Continued)

*Primary Examiner*—Hezron Williams
*Assistant Examiner*—Alex DeVito
(74) *Attorney, Agent, or Firm*—Finnegan, Henderson, Farabow, Garrett & Dunner, L.L.P.

(57) ABSTRACT

A method for calculating a µ-slippage curve for a tire based on laboratory data derived from characteristic values of a used compound, of the road surface and a vehicle without producing a complete tire, and a method for calculating a µ-slippage curve for a tire include the steps: calculating a friction force between rubber compound and a rough surface based on a friction coefficient for different slippage values and lateral positions of the tire wherein the friction coefficient is calculated depending on a sliding velocity between the rough surface and a tread block and on a temperature of the tire. After calculating the friction force, the motion of a tread block depending on pressure distribution during the movement of the tread block through the contact area and on characteristics of a tire body is calculated. The resulting µ-slippage curve is composed from effective µ-slippage values for different slippage values wherein effective µ-slippage values are calculated based on the friction force and a nominal force derived from the pressure distribution.

14 Claims, 9 Drawing Sheets

U.S. PATENT DOCUMENTS

| | | | | |
|---|---|---|---|---|
| 4,958,512 | A | * | 9/1990 | Johnsen .......................... 73/9 |
| 5,814,718 | A | * | 9/1998 | Andresen et al. ................. 73/9 |
| 5,948,961 | A | * | 9/1999 | Asano et al. ..................... 73/9 |
| 7,113,858 | B2 | * | 9/2006 | Miyazaki ..................... 701/71 |
| 2002/0011093 | A1 | * | 1/2002 | Matsuno .......................... 73/9 |
| 2003/0051544 | A1 | * | 3/2003 | Hong .......................... 73/146 |
| 2004/0112128 | A1 | | 6/2004 | Liebemann et al. |
| 2008/0156067 | A1 | * | 7/2008 | Lin et al. ......................... 73/9 |

OTHER PUBLICATIONS

De Wit, C. C., "Dynamic Tire Friction Models for Vehicle Traction Control," Proceedings of the 38$^{th}$ Conference on Decision & control, Phoenix, Arizona, USA, pp. 3746-3751, (Dec. 1999).

Claeys, X. et al., "A Dynamic Tire/Road Friction Model for 3D Vehicle Control and Simulation," 2001 IEEE Intelligent Transportation Systems Conference Proceedings, Oakland, CA, USA, pp. 483-488, (Aug. 25-29, 2001).

Moyar, G. J. et al., "Effect of Wheel Diameter on High-Adhesion Locomotive Wheel Tread Thermo-Mechanical Stresses," Railroad Conference, Proceedings of the 1995 IEEE/ASME Joint Baltimore, MD USA, pp. 119-127, (Apr. 4-6, 1995).

English-language Abstract of DE 102 08 998 A1.

* cited by examiner

METHOD FOR CALCULATING A FRICTION-SLIPPAGE CURVE FOR A TIRE

CROSS REFERENCE TO RELATED APPLICATIONS

This application is a national phase application based on PCT/EP2005/054263, filed Aug. 30, 2005, and claims the priority of European Application No. 04022339.8, filed Sep. 20, 2004, the content of both of which is incorporated herein by reference.

BACKGROUND OF THE INVENTION

1. Field of the Invention

The invention relates to a method for calculating a μ-slippage curve of a tire.

2. Description of the Related Art

The degree of safety is one of the most important features for the development of a tire and consequently for a vehicle using this tire.

One of the most important characteristics for the safety of a tire is the friction coefficient. The friction coefficient is a characteristic value of a tire describing the capacity of the tire to disperse energy during driving maneuvers in order to maintain the control of the vehicle during curve, braking or acceleration. Often this characteristic is called "grip" of the tire.

Normally car manufactures ask tire manufacturer to qualify a tire by using a braking test. By implementation of electronic control systems, the behavior of the friction coefficient in dependence on the relative sliding velocity of tire and road is a very important parameter to optimize braking distances and driving behavior of a car. For evaluating this dependence, the so called μ-slippage curve is used. The μ-slippage curve illustrates the relation between tire load and braking force in dependence on the relative velocity between tire and road. During the braking test the difference between velocity of the car and tire velocity is measured (slipping velocity) on a special trailer and the force induced on the tire axle in driving direction and vertical direction is measured and expressed as friction coefficient of the tire.

The μ-slippage curve is used for forecasting the braking behavior of a car. Moreover it is really important for adopting and designing the under- and oversteering behavior of a car during steering.

To make the conventional braking test it is required to produce a tire and to test the tire. The production of a tire is very expensive and time consuming. During the development of new compounds for tires, it is not possible to run the braking test for all possible variations of a new compound. However a selection of features of the used compound must be made based on laboratory tests. Normally the laboratory tests are basic tests executed on laboratory samples and do not describe directly the tire behavior. The selection of the used compound is made substantially based on the experience of the compound developing engineers.

Former methods for estimating a μ-slippage curve of a tire are based on calculations used constant values for the friction coefficient. However the comparison of the estimated μ-slippage curves based on constant values for the friction coefficient with real measurements on a tire shows the uselessness of such estimation methods.

SUMMARY OF THE INVENTION

Therefore it is an object of the present invention to provide a method for calculating a μ-slippage curve for a tire based on laboratory data derived from characteristic values of a used compound, of the road surface and the car without producing a complete tire.

It is also an object of the present invention to provide a method for calculating a μ-slippage curve for a tire (10) comprising the steps:

calculating a friction force $F_{0i}(t)$ between a rubber compound and a rough surface (14) based on a development of a friction coefficient μ(t) during a contact time (t) and lateral positions (i) of the tire;

calculating the friction coefficient μ(t) depending on a sliding velocity $v_b$ between the rough surface (14) and a tread block (11) and at a temperature Tq(t) of the tire (10);

calculating a motion of a tread block (11) depending on a pressure distribution during movement of the tread block (11) through a contact area $A_0$ and on characteristics of a tire body (12);

calculating effective μ-slippage values $\mu_{slip}$ for different slippage values $s_{slip}$ based on the friction force $F_{0i}(t)$ and a nominal force $F_{Ni}(t)$; and providing a μ-slippage curve based on the effective μ-slippage values $\mu_{slip}$ for different slippage values $s_{slip}$.

The Invention is based on the thought that the friction coefficient depends on several characteristic values. In particular it depends among others on a complex dynamic modulus of a used rubber compound, further on a roughness of a road, on a contact area of a tread block, on a temperature of a tire and on the velocity of the tire.

The complex dynamic modulus E of the rubber compound is a function of frequency and temperature. In detail the complex dynamic modulus E will increase with increasing frequency and in contrary decrease with increasing temperature. With increasing sliding velocity of the tire during driving on a road the frequency of interaction between the surface and the tire will increase, causing an increasing complex dynamic modulus E.

The invention provides a method for calculating the μ-slippage curve considering several characteristic values. These several characteristic values describing the behavior of a tire. By considering the development of a friction coefficient depending on changes of a sliding velocity of a tread block and on changes of a temperature of a tire, the calculation procedure provides a realistic μ-slippage curve without producing the tire. The several characteristic values could be derived by measuring, simulating or calculating. By selecting appropriate characteristic values an application specific μ-slippage curve could be provided. Since the method does not require a production of the tire several different compounds could be used for calculating. Further different combinations of tire constructions and compounds could be used for calculating respective μ-slippage curves. By changing the characteristic value describing the roughness of the road the behavior of a tire on different pavements could be simulated.

In a preferred embodiment of the inventive method the friction coefficient μ(t) is calculated depending on the friction induced temperature increase Tq(t). Since the tire is getting warmer during movement through a contact patch the characteristic values related to the tire will change. This temperature change is called flash temperature Tq(t). The inventive method uses the changes in temperature for calculating the friction coefficients. By considering the flash temperature a realistic μ-slippage curve is provided.

In a further embodiment of the inventive method the impact of frequency and temperature on a real contact area, energy dissipation and a tread block stability of the tire are considered also. However the interaction between surface and tire will also cause an increasing of temperature of the tire. But an increasing of temperature will reduce the complex dynamic modulus E and thereby cause contrary effects to frequency dependence. The consideration of the influences of the friction induced temperature increase on the contact area, the energy dissipation and the motion of a tread block will further improve the resulting μ-slippage curve.

The calculation of a μ-slippage curve for a tire is based on several single calculations. Interim values of the procedure are stored and used in further steps of the procedure. It is further advantageous to use interim values for updating characteristic values. The inventive method calculates the μ-slippage curve in an iterative way. Characteristic values are constantly updated resulting in an improved accuracy of the μ-slippage curve.

To calculate a μ-slippage curve for a tire the relation of friction force $F_{Oi}(t)$ to the nominal force $F_{Ni}(t)$ needs to be calculated in dependency on the contact time (t) and the discrete lateral positions (i) for each discrete slippage value. This implies the calculation of the stick slip effect for each discrete lateral position. The stick slip effect at a discrete lateral position could be described by monitoring the local sliding velocity at a bottom of a tread block during contact time and the local shear stress during contact time. Having this behavior calculated the local friction coefficient μ(t) for a lateral position could be derived. By integrating all local friction coefficients μ(t) over contact time for each lateral position and each slippage value a μ-slippage curve for a tire could be composed.

Advantages achieved by using the inventive method are reduced costs and reduced time for providing a μ-slippage curve. Further the inventive method increases the number of options in particular the number of used compounds or mixtures of compounds that can be investigated during development of a tire. Analyzing a μ-slippage curve of a compound will show advantages and disadvantages of a combination of a used rubber compound and a tire construction. Thus the compound of a tire and the used tire construction could be adopted more exact resulting in an improved driving behavior of a car during driving straightforward and in curves.

The object is also solved by a computer program and a system for displaying a μ-slippage curve comprising means for performing the method as described above.

BRIEF DESCRIPTION OF THE DRAWINGS

The accompanying drawings, which are incorporated in and constitute part of the specification, illustrate several embodiments of the present invention by way of example only. Together with the general description given above and the detailed description of the embodiments given below, the schematic drawings serve to explain the principles of the present invention.

In the drawings:

FIG. 7a illustrates a horizontal shifting factor at;

The drawings are provided for illustrative purpose only and do not necessarily represent practical examples of the present invention to scale.

DETAILED DESCRIPTION OF THE INVENTION

In the following an exemplary embodiment of the invention is described. Although the present invention is applicable in a broad variety of applications it will be described with the focus put on a tire having tread blocks with one layer only. A further application for the invention might be the use of a tread block having two or more layers.

Figure 1A:
FIG. 1a illustrates a tire profile having several tread blocks.
Figure 1B:
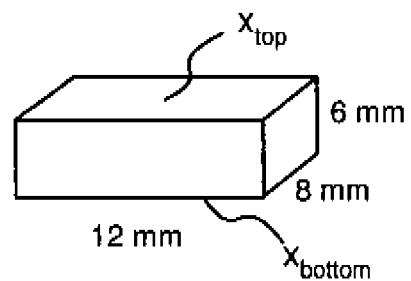
FIG. 1b illustrates a simplified tread block having one layer.

A contact patch of tire 10 is illustrated in FIG. 1a. The contact patch is also called footprint. The contact patch is composed from footprints of several tread blocks 11. The arrangement of tread blocks 11 on the tire 10 forms the well known profile of the tire. A schematic tread block 11 is illustrated in FIG. 1b. Each tread block 11 has a geometrical form having dimensions, wherein the dimensions of a tread block may vary. As illustrated in FIG. 1a the tread blocks 11 at the edge of the tire have different dimensions as the tread blocks 11 arranged in the middle of the tire. FIG. 1a further illustrates different lateral positions A-H of a tire. These different lateral positions A-H are exposed to different pressure distributions during movement through a footprint area or contact patch of the tire in driving direction.

Figure 2A:
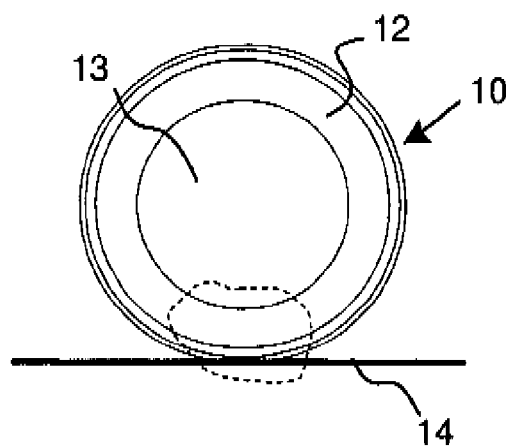
FIG. 2a illustrates schematically a tire.
Figure 2B:
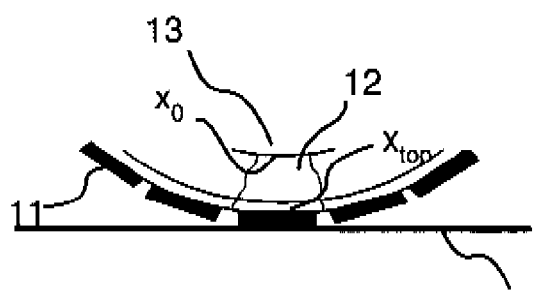
FIG. 2b illustrates an enlargement of a tire in contact with a road.

A very rough illustration of a tire 10 is given in FIG. 2a. The tire 10 includes a profile having tread blocks (not illustrated). The profile is located on a tire body 12. The tire body 12 is fixed on a rim 13. During driving the tire 10 contacts a road surface 14 having a given roughness, wherein a contact between tread blocks 11 and road surface 14 is illustrated in FIG. 2b.

Figure 3A:
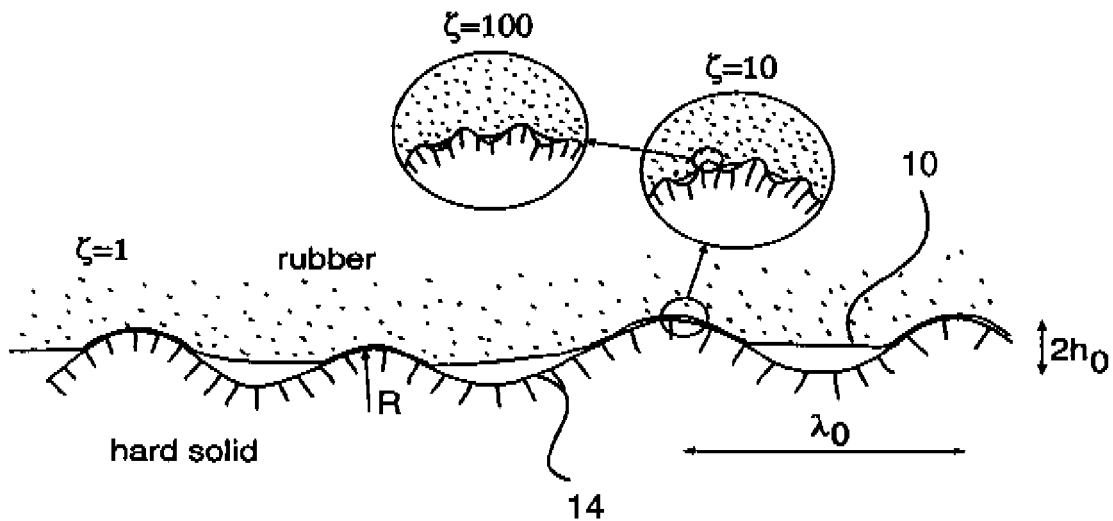
FIG. 3a illustrates the real contact behavior between rubber and a rough surface.

A macroscopic view of the contact between rubber compound of a tread block 11 and road surface 14 is illustrated in FIG. 3a. The road surface 14 provides a certain roughness, which is indicated by a wave line. Each wave has its height h, wherein $\lambda_o$ is a distance between peaks of the waves. The rubber compound of the tire 10 contacts the waves of the road 14 only in the area of the peaks, wherein valleys are not contacted by rubber compound. A further enlargement of a contact area (ξ=10) shows, that the rubber compound contacts the road 14 in the same way as for ξ=1. Also in case of a higher enlargement (ξ=100) the rubber shows this behaviour.

A tire on a personal car makes apparent contact with the road surface 14 in the tire footprint area, having a nominal area $A_0$ of about 100 cm². Because of the road surface roughness and the contact behavior of the rubber as shown above the real contact area P(q) of a tire is much smaller, usually about a few percent of the nominal contact area $A_0$, i.e., in the range of 1 cm². The local contact pressure in the real contact area P(q) leads to very large local rubber deformations and high local temperatures. This friction induced temperature can be easily experienced by feeling the increased temperature of the tire or measuring it. This is often referred as the "flash temperature" Tq(t). The inventive method calculates the μ-slippage curve of a tire under consideration of the friction induced flash temperature Tq(t).

Figure 3B:
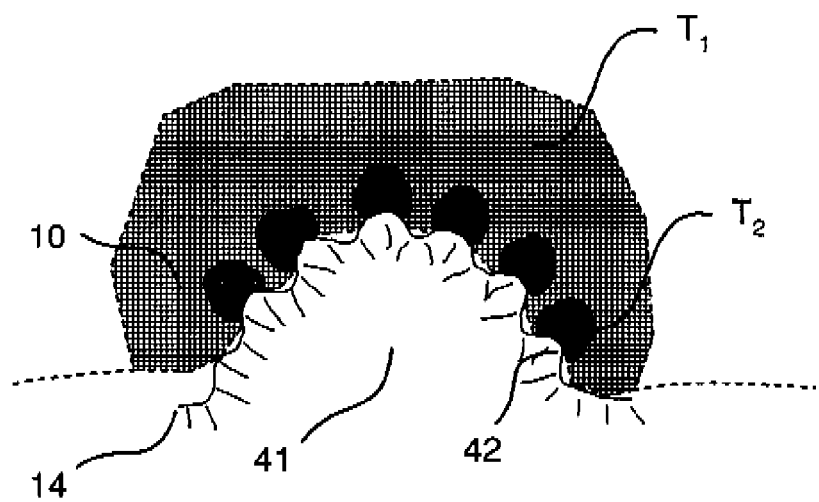
FIG. 3b illustrates the influence of the flash temperature in different volume elements.

FIG. 3b illustrates the influence of the flash temperature Tq(t) on the behavior of the tire. Having a road surface envisaging asperities with two different scales (41 big wave, 42 small waves) there is a temperature increase $T_1$ which involves a large volume element and a second temperature increase $T_2$ due to small asperities 42 related to smaller volume elements. The global temperature of the tire during movement in driving direction will be the sum of these two temperature increases $T_1$, $T_2$. In the first large volume element the temperature will be $T_1$ over a starting background temperature of $T_0$, wherein the temperature in the second smaller volume element will be $T_2$ higher then $T_1$. Since the temperature affects the complex dynamic modulus E, the real contact area P(q) of the tire and the motion of the tread block 11 the influence of the flash temperature Tq(t) in respect to the behavior of the tire may not be neglected.

Figure 4:
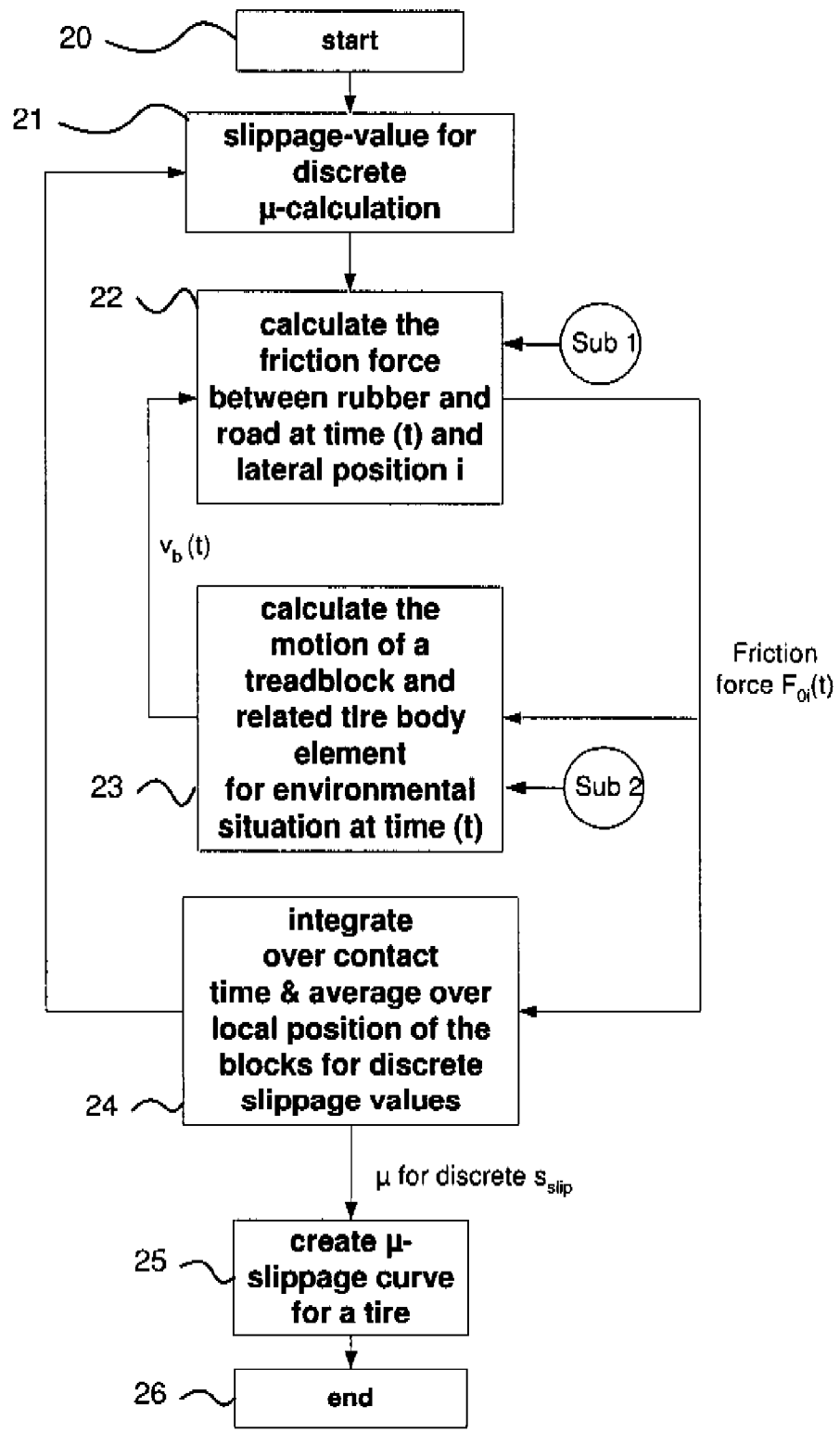
FIG. 4 illustrates a flow chart illustrating the method for calculating a μ-slippage curve according to the invention.

In the following the method for calculating the μ-slippage curve for a tire according to the present invention is explained in more detail. FIG. 4 illustrates the main steps required for calculating a μ-slippage curve for a tire. The μ-slippage curve is composed from several single calculations of friction coefficients for a given slippage value slip. To compose the μ-slippage curve for a tire a plurality of calculations of friction coefficients μ(t) for several discrete slippage values $s_{slip}$ are made.

After having started the calculation procedure in step 20 the slippage value $s_{slip}$ will be set in step 21.

The slippage value $s_{slip}$ during braking is derived by the following formula $$s_{slip} = \frac{v_{car} - v_{tire}}{v_{car}} \quad (1)$$

wherein $s_{slip}$ is the slippage value normally given in percent, however in the illustrated embodiment it will be used as a real number without measure, $v_{car}$ being the velocity of the car in m/s, $v_{tire}$ being the rolling velocity of the tire in m/s. The slippage value $s_{slip}$ describes the degree of slippage. If a tire has a low slippage value it has nearly the same rolling velocity as the car. In contrary a slippage value of 100% occurs in case of full braking and a blocking of the tire, resulting in a sliding velocity $v_b$ of the tire at the bottom of a tread block or at the interface between tire and road, which is closely to the velocity of the car.

For providing the friction coefficient μ(t) for the tire a calculation of the slip stick effect and the resulting sliding velocity at the bottom of tread block on a given place x(t) have to be calculated. Since the bottom velocity $v_b$ of a tread block depends on several characteristic values the friction coefficient μ(t) between the compound of a tire and the road will be calculated at first to derive the friction force $F_{0i}(t)$ depending on time. This calculation is performed in step 22 of the flow chart. The calculation of the friction force $F_{0i}(t)$ is performed for each lateral position i of the tire.

After having calculated the friction force $F_{0i}(t)$ depending on contact time and lateral position i the motion of a tread block has to be calculated using the Newtons equations. By solving the Newtons equations the sliding velocity $v_b(t)$ at bottom of a tread block at time (t) could be calculated. This sliding velocity at bottom of a tread block is feedback to the calculation of friction force $F_{0i}(t)$ for the next point in time in step 22, since a changed velocity $v_b$ changes also the friction force $F_{0i}(t)$. The friction force $F_{0i}(t)$ calculated at the first cycle in step 22 is then the friction force $F_{0i}(t')$ at time t' and so on.

The calculation of the friction force $F_{0i}(t)$ will be made for each lateral position i of the tread blocks during the movement through the contact patch. The calculated friction force $F_{0i}(t)$ during the contact time for each lateral position of the tread blocks is forwarded to step 24. In step 24 an effective friction coefficient $\mu_{slip}$ will be calculated using the friction force $F_{0i}(t)$ and a nominal force $F_{Ni}(t)$ during the contact time for each lateral position. Following formula is used for calculating the effective friction coefficient $\mu_{slip}$ for a tire $$\mu_{slip} = \frac{\sum_{i=1}^{N} \int_0^{\tau_i} dt F_{0i}(t)}{\sum_{i=1}^{N} \int_0^{\tau_i} dt F_{Ni}(t)} \quad (2)$$

wherein lateral positions i of the tread block 11 on the tire 10 are denoted as i and $t_i$ being the contact time of the tread block at a defined position of the respective tread block during the movement through the contact patch.

The effective friction coefficient $\mu_{slip}$ is calculated for a plurality of slippage values $s_{slip}$ by returning to step 21, wherein the procedure is performed again for a different slippage value $s_{slip}$. Thus the μ-slippage curve for a tire could be created in step 25.

In the following the calculation of the friction force $F_{0i}(t)$ between the rubber compound and the road 14 will be described in more detail. FIG. 5b illustrates the procedure for calculating the friction force $F_{0i}(t)$.

For calculating the friction force $F_{0i}(t)$ several input parameters are required.

Figure 5A:
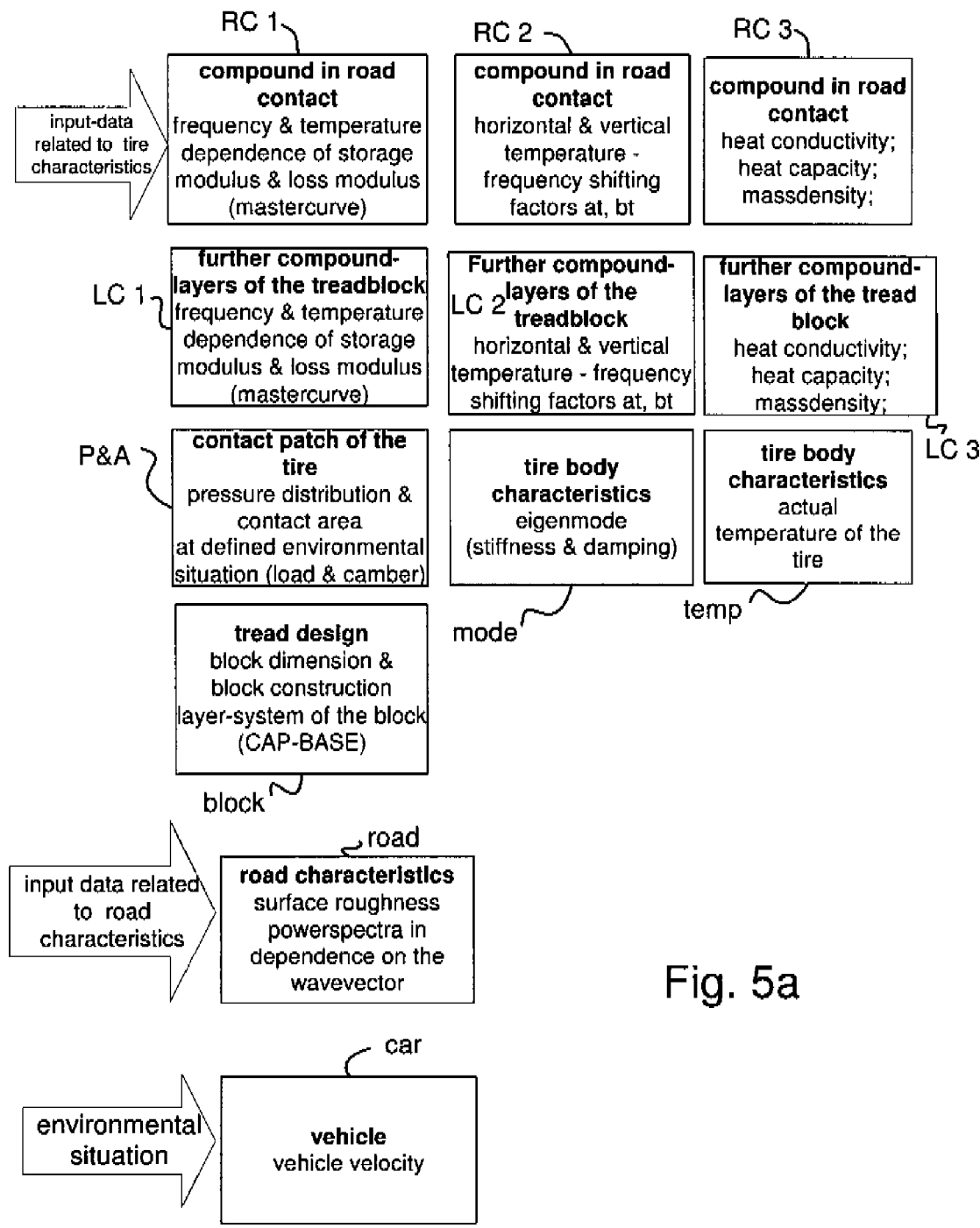
FIG. 5a illustrates input values for the method.
Figure 5B:
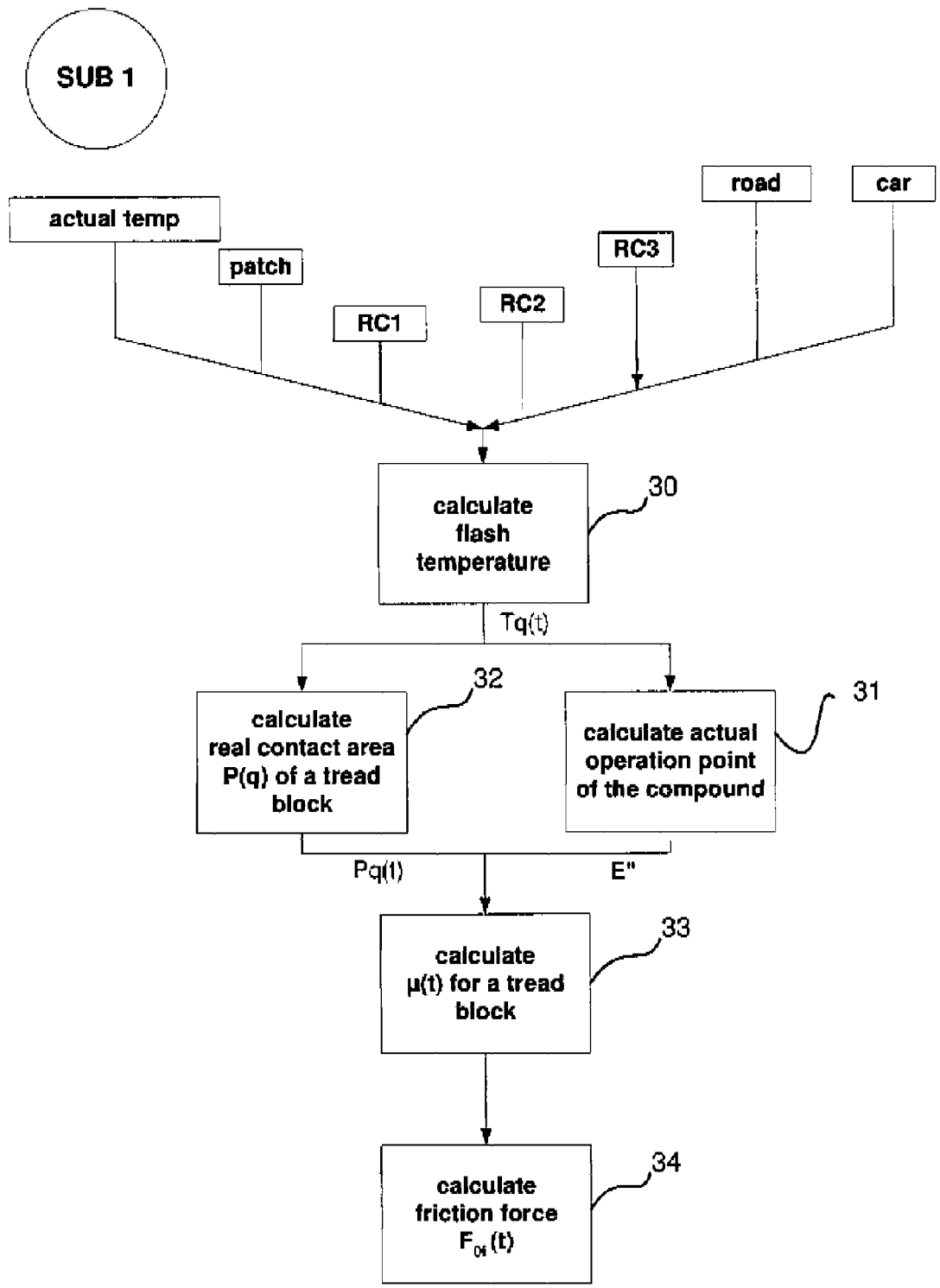
FIG. 5b illustrates a first sub flow chart for chart according to FIG. 4.

The used input parameters are shown in FIG. 5a. There are input data related to characteristics of the tire, the road and the car.

In particular the tire related characteristic values are: the complex dynamic modulus E including the storage modulus E' (real part) and the loss modulus E" (imaginary part). The complex dynamic modulus E depends on the frequency and the temperature. To provide the complex dynamic modulus E a so called master curve will be generated based on the used rubber compound. There are several methods for deriving such master curve. The master curve could be provided i.e. by measuring the dynamic modulus E for a used compound within a limited frequency range (0,1-100 HZ) and generating a master curve showing the dependency of the dynamic modulus (E', E") over the frequency in a wide range by using a super position principle of temperature and frequency. The master curve for the dynamic modulus E', E" is described as RC1. An exemplary master curve is given in FIG. 7.

For providing the frequency dependence of the complex dynamic modulus E for different temperatures horizontal and vertical shifting factors at, bt are used to transfer the dynamic modulus E. This set of input data is described with RC2. An exemplary illustration for a horizontal and vertical shifting factor at, bt is given in FIGS. 7a and 7b. A further set of input data relates to the characteristics of the used rubber compound. To describe the characteristics of the used rubber compound following parameters needs to be provided: the heat conductivity λ in W/mK, the heat capacity $C_v$ in J/K and the mass density ρ in kg/m³. These material related characteristic values are measured or could be derived from the composition of the compound.

Figure 6:
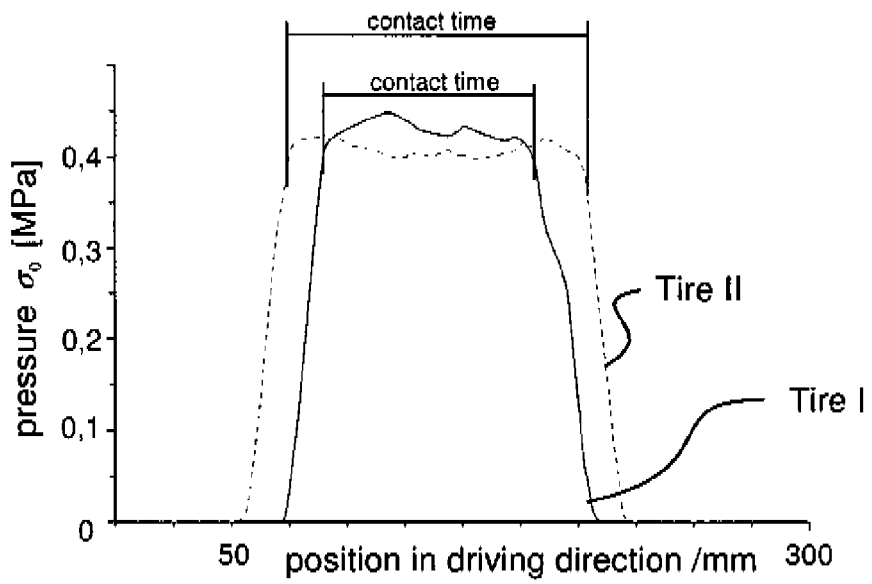
FIG. 6 illustrates a pressure distribution and the contact time of a tire I and tire II in relation to the position in driving direction.

A further important input data is the pressure distribution. The nominal force $F_N(t)$ could be deduced from the pressure $\sigma_0$ and the nominal contact area $A_0$. The pressure distribution depends on the position of the tread block during its movement through the contact patch. The pressure $\sigma_0$ on a certain lateral position e.g. B in FIG. 1a will be low at the moment when the tread block under consideration is not in contact or will start to contact the road surface. The pressure on the tread block will increase if the tread block contacts the road surface with its whole nominal area. At the end the pressure will decrease since the tread block leaves the road surface. FIG. 6 illustrates the pressure distribution for tire I and tire II at lateral position B (FIG. 1a) and describes the changes in the pressure $\sigma_0$ during movement through the contact patch. The real contact area P(q) must be provided also. As described above the real contact area P(q) is much smaller than the nominal contact area $A_0$, because of the contact behaviour of the rubber shown in FIG. 3a. The real contact area P(q) depends on the frequency and the temperature. If the rubber is getting softer because of higher temperature the real contact area P(q) will increase. However if the excitation frequency of the rubber due to rough surface of the road and increasing sliding velocity of the tread block increases the rubber is getting stiffer resulting in a decreasing contact area P(q). The calculation of the real contact area P(q) will be described later. The pressure distribution and the contact area $A_0$ are combined to a set of input data called "P&A".

If a so called cap base construction of a tread block is used the compound characteristics of further layers have to be considered also. The characteristic values used as input data are illustrated in FIG. 5a. There are input data LC1, LC2, and LC3 characterizing the further compound.

Further input data are tire body characteristics. The tire body characteristics are illustrated: in a spring—damper system. The tire body characteristics include the damping $\gamma_c$ and the stiffness $k_c$. The tire body characteristics can be adapted from the eigenmode characteristics of the tire body. This input data being denoted as "mode". The tire body characteristics are measured or calculated using known models.

A further very relevant parameter is the temperature T of the tire. Since the temperature changes due to the friction induced flash temperature Tq(t) the complex dynamic modulus E needs to be calculated based on updated temperature values. The starting temperature $T_0$ is the background temperature of the tire. However during calculating the friction force $F_{0i}(t)$ between the compound and the road for a given time the temperature T of the tire increases with proceeding times.

A further input data set is called 'block' including the tread block dimensions and in case of a layer system the block construction.

Input data related to the road are called 'road' including the surface roughness of the road. The surface roughness of the road could be measured and is provided as surface power spectra C(q).

A further input value is the velocity of the car $v_{car}$.

After having explained all necessary input data required for calculating the friction force $F_{0i}(t)$ the procedure for calculating the friction force $F_{0i}(t)$ will be described in more detail.

FIG. 5b illustrates the necessary steps for calculating the friction force $F_{0i}(t)$ between rubber and road for a given time and lateral position i.

The friction induced energy production $\dot{Q}$ per volume unit and time unit can be described by $$\frac{\partial T}{\partial t} - D\nabla^2 T = \frac{Q(x,t)}{\rho C_v}, \quad (2a)$$

wherein D is the heat diffusivity and $\dot{Q}$ being the friction induced energy production per volume unit and time unit. The calculation of $\dot{Q}$ takes in account large deformations in the body of the compound due to big asperities 41 and small, high frequency deformations coming from small asperities 42 due to wide distributions of wave scale for a real surface. This is illustrates in FIG. 3b.

The following formula considers the friction induced energy production $\dot{Q}$ per volume unit and time unit. The resulting temperature is called flash temperature $T_q(t)$ and is calculated based on following formula:

$$T_q(t) = T_0 + \int_0^t dt' g(t,t') \int_0^\infty dq' f(q',t') \frac{1}{\pi} \int_0^\infty dk \frac{4q^2}{k^2+4q^2} \frac{4q'}{k^2+4q'^2} e^{-Dk^2(t-t')} \quad (3)$$

wherein $T_0$ is the background or starting temperature, k is an integration variable and D the heat diffusivity, g (t, t') is calculated according to following formulas $$g(t,t') = h(w) \quad (4)$$

$$w = w(t,t') \quad (5)$$

$$w(t,t') = [x_{bottom}(t) - x_{bottom}(t')]/2R \quad (6)$$

$$R = \pi/q_0 \quad (7)$$

$$h(w) = 1 - \frac{2}{\pi}w(1-w^2)^{\frac{1}{2}} - \frac{2}{\pi}\arcsin(w) \quad (8)$$

wherein $x_{bottom}(t)$ is the position of the centre of the tread block at time t at surface to the road, $x_{bottom}(t')$ is the position of the centre of the tread block at time t' at surface to the road, wherein t' is the preceding value of t, q is the wavenumber, $q_o$ is the upper cut off length of the road surface power spectra C(q) and $q_1$ is the lower cut off length of the road surface power spectra C(q). An illustration of an exemplary power spectrum is given in FIG. 8.

A further element for calculating the flash temperature Tq(t) is f(q,t), which is derived by following formula $$f(q,t) = \frac{v}{\rho C_v} q^4 C(q) \frac{P(q)}{P(2q_0)} \int_0^{2\pi} d\phi \cos\phi \text{Im} \frac{E(qv_b\cos\phi, T_4(t))}{(1-v^2)} \quad (9)$$

wherein $v_b$ is the sliding velocity of the tread block bottom at time t, ρ is the mass density and $C_v$ is the heat capacity, C(q) is the power spectra of the road and P(q) is the real contact area at a given frequency, and E is the complex dynamic modulus depending on velocity, frequency and temperature Tq(t); $v^2$ is the poisson ratio.

After having calculated the flash temperature Tq(t) in step 30 the next step 31 calculates the actual operation point of the compound depending on the new temperature, which includes the calculation of the imaginary part Im E" of the complex dynamic modulus E according to following formula:

$$\text{Im} \frac{E(qv_b\cos\phi, T_q(t))}{(1-v^2)\sigma_0(t)} \tag{10}$$

wherein $\sigma_0(t)$ is the nominal pressure at time t, which is calculated using the nominal force $F_N(t)$ related to the nominal contact area $A_0$ according to formula $$\sigma_0(t) = \frac{F_N(t)}{A_0} \tag{11}$$

The nominal pressure of an exemplary lateral position (B) of a tread block of tire I and tire II during the contact time is given in FIG. 6.

The calculation of the real contact area P(q) is performed in step 32 depending on the flash temperature Tq(t). The real contact area P(q) is calculated using following formula:

$$P(q) = \frac{2}{\pi} \int_0^\infty dx \frac{\sin x}{x} e^{[-x^2 U(q)]} \tag{12}$$

wherein the term U is derived by the following formula $$U(q) = \frac{1}{8} \int_{q_0}^q dq q^3 C(q) \int_0^{2\pi} d\phi \left| \text{Im} \frac{E(qv_b\cos\phi, T_q(t))}{1-v^2} \right|^2 \tag{13}$$

so the real contact area P(q) depends also on the complex dynamic modulus E and the power spectra C(q) of the road.

Having calculated both values P(q) and Im E" the friction coefficient µ(t) between rubber compound and road surface at a time t and lateral position i could be calculated using the following formula $$\mu(t) = \frac{1}{2} \int_0^{q_1} dq q^3 C(q) P(q) \int_0^{2\pi} d\phi \cos\phi \text{Im} \frac{E(qv_b\cos\phi, T_q(t))}{(1-v^2)\sigma_0(t)}$$

Based on the friction coefficient µ(t) the friction force $F_{0i}(t)$ could be calculated in step 34 using the formula $$F_{0i}(t) = \mu(t) F_{Ni}(t) \tag{15}$$

Figure 5C:
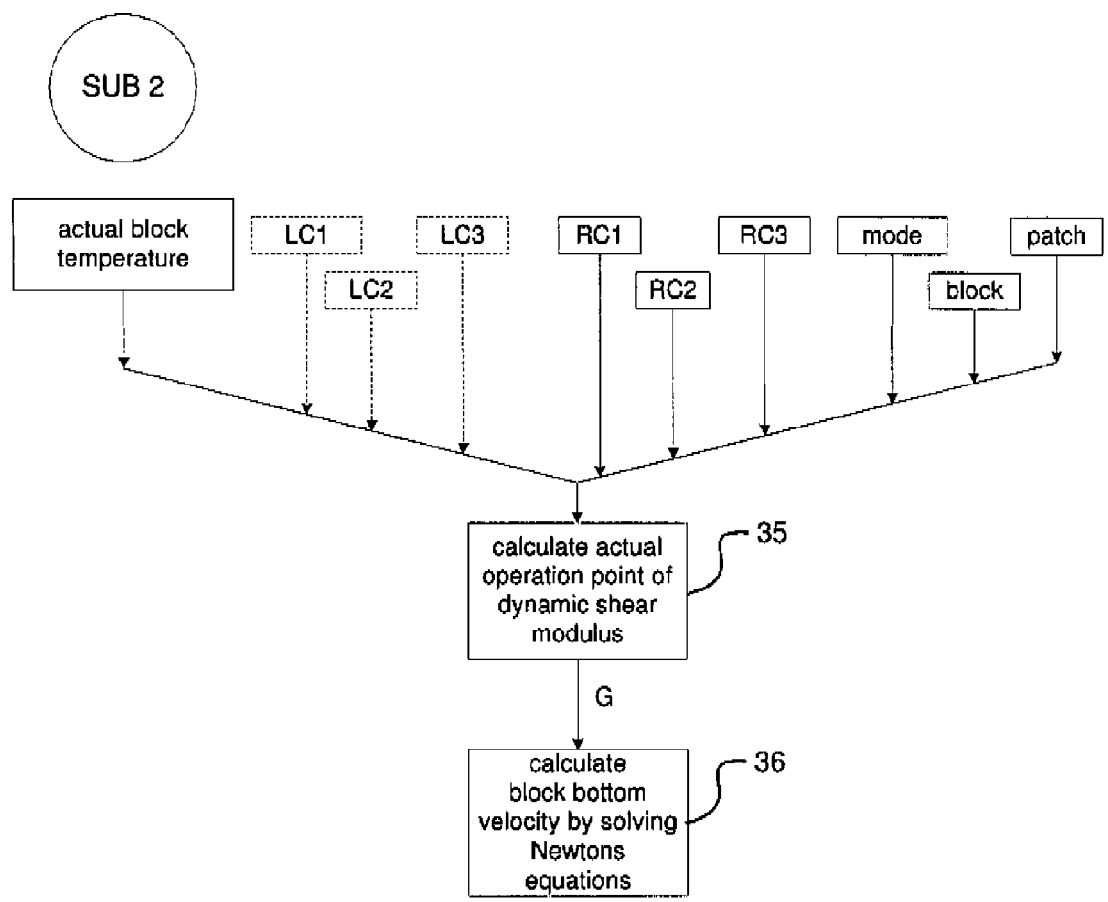
FIG. 5c illustrates a second sub flow chart for chart according to FIG. 4.

This value $F_{0i}(t)$ will be delivered to the next step 23 and 24 in the main procedure given in FIG. 5a. In step 23 the motion of the tread block 11 and the related tire body element 12 is calculated for environmental situation at time (t). The motion is calculated using the sub flow chart illustrated in FIG. 5c. Having the plurality of input data the actual operation point of a dynamic shear modulus G is calculated by using the formula $$G = 1/3E \tag{16}$$

and shear force $F_1(t)$ $$F_1(t) = \int_0^t dt' A_0 G(t-t') \varepsilon(t') \tag{17}$$

wherein ε is the shear strain calculated by formula $$\varepsilon = \frac{x_{top}(t) - x_{bottom}(t)}{L_z} \tag{18}$$

wherein $L_z$ is the block height.

With this relation the Newton's equations could be solved One equation describing the tire body movement, as follows $$M_C \ddot{x}_{top}(t) = k_C[x_0(t) - x_{top}(t)] - M_C \gamma_C [\dot{x}_{top}(t) - \dot{x}_0(t)] - F_1(t) \tag{19}$$

a further equation relates to the tread block $$M_{block} \ddot{x}_{bottom}(t) = F_1(t) - F_0[x_{bottom}(t)] \tag{20}$$

wherein $M_c$ is the mass of the tire body, $k_c$ is the spring constant for the tire body and $\gamma_c$ is the damping factor of the tire body, $x_0(t)$ is the position of the rim, $x_{top}(t)$ is the position of the centre of the tread block at time t at interface between tread block and tire body. By solving these Newtons equations 19, 20 the sliding velocity $v_b$ could be calculated. This sliding velocity $v_b$ at a bottom of a tread block describes the slip stick effect. The velocity $v_b$ is feedback to the step 22 for upgrading the calculation of the friction force $F_{0i}(t)$ using the newly calculated velocity $v_b$ for the next point in time.

The friction force $F_{0i}(t)$ calculated in step 22 is forwarded to step 24 and integrated over the contact time of the tread block with the road at defined lateral position i. Having calculated the friction force $F_{0i}(t)$ for all lateral positions i under consideration of the friction induced flash temperature Tq(t) the effective µ-slippage value $\mu_{slip}$ for the set discrete slippage value $s_{slip}$ is calculated in step 24 using formula (2).

For calculating a further effective µ-slippage value $\mu_{slip}$ for the next discrete slippage value $s_{slip}$, i.e. for a slippage value of 15%, the procedure will be started again. The procedure including the steps 21, 22, 23, 24 is repeated for each discrete slippage value $s_{slip}$, wherein the distance between the slippage values $s_{slip}$ depends on a required accuracy and a given processing power of the computing device performing the procedure.

Figure 10:
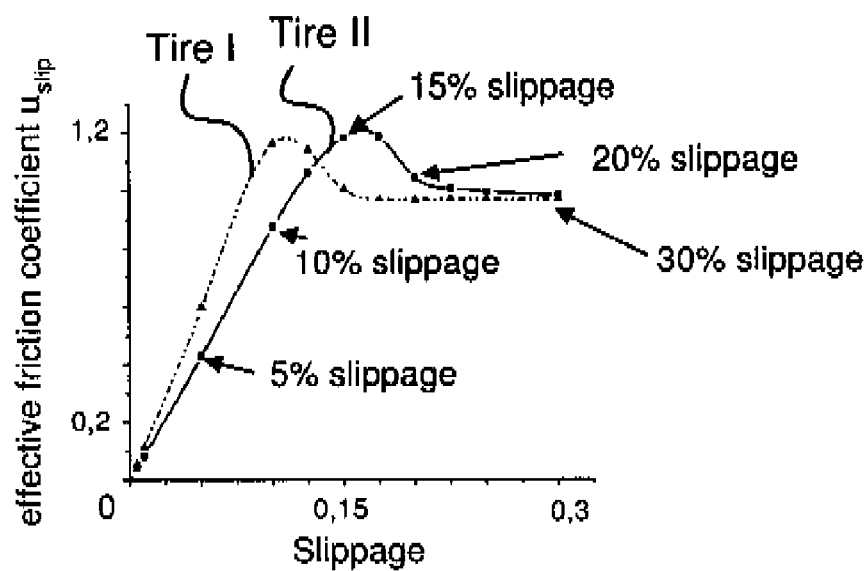
FIG. 10 illustrates a resulting effective μ-slippage curves for tire I and II having the pressure distribution acc. to FIG. 6.

The effective µ-slippage value $\mu_{slip}$ for the discrete slippage value $s_{slip}$ is forwarded from step 24 to step 25. In step 25 the µ-slippage curve for a tire is composed. To obtain a µ-slippage curve as illustrated in FIG. 10 the effective µ-slippage values $\mu_{slip}$ are graphical illustrated in dependency of the slippage values $s_{slip}$.

In the following several input characteristics or methods for deriving such input characteristics are described in more detail.

As mentioned above FIG. 1a illustrates different lateral positions A, B, C, D, E, F, G, H of tread blocks. An exemplary pressure distribution for lateral position B is illustrated in FIG. 6. It should be noted that the pressure distribution varies depending on the lateral position. This pressure distribution is used for determining the nominal force $F_N(t)$ used in the formulas (2, 11, 15). The pressure distribution in the contact patch could be derived by using a matrix of pressure sensitive sensors. So it is possible to detect the local pressure distribution of a tire in the contact patch. Alternatively finite element simulation can support the procedure with the needed data. It is noted that the pressure distribution in the area of the grooves of the profile is nearly zero, wherein the pressure distribution is interpolated in that areas. Since the inventive method does not use real tires exemplary tires having a specific profiles and a certain internal pressure are used to derive the pressure distribution. For developing a specific compound the inventive method could be used by applying different pressure distributions, e.g. measured from tires having different internal pressures or a summer or winter profile.

Figure 7:
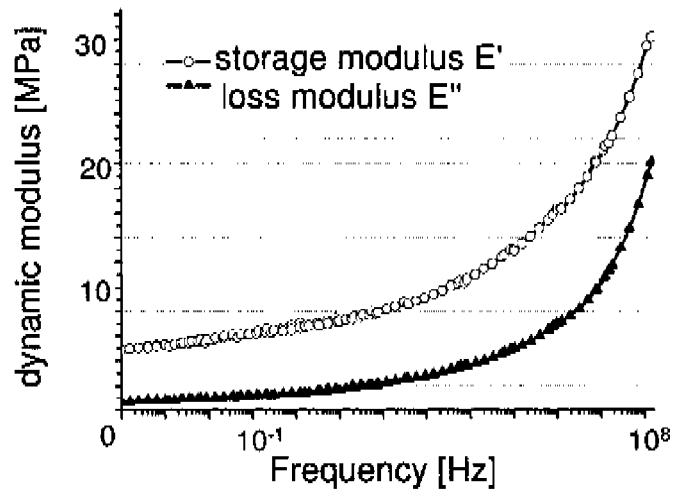
FIG. 7 illustrates the dependency of the dynamic modulus E (master curve) from the frequency.
Figure 7A:
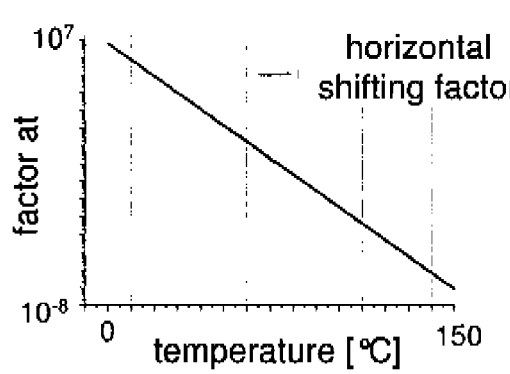
Figure 7B:
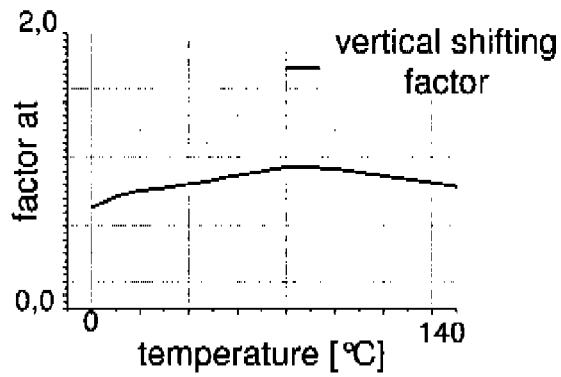
FIG. 7b illustrates a vertical shifting factor bt.

An exemplary a master curve illustrating the dynamic modulus E of a compound is given in FIG. 7. Further the horizontal and vertical shifting factors at, bt are illustrated in FIGS. 7a and 7b. The shifting factors at, bt are used for transforming the frequency dependence of the complex dynamic modulus E in the master curve into a different reference temperature.

Figure 8:
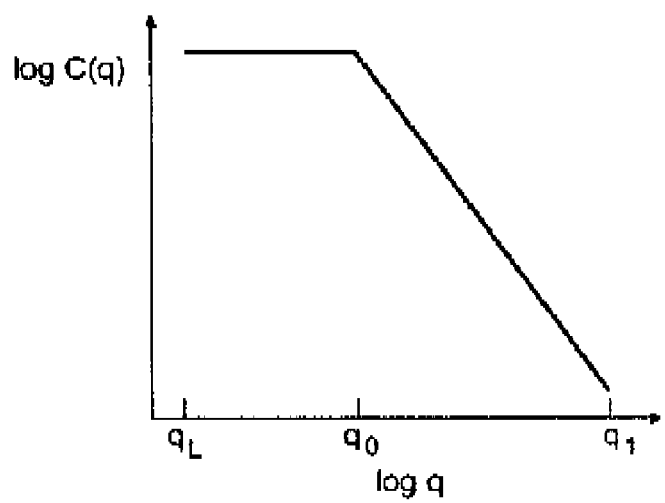
FIG. 8 illustrates a power spectra C(q) of the road surface texture.

FIG. 8 illustrates a power spectra C(q) of a road. The power spectra is calculated by following the formula $$C(q) = \int d^2 x \langle h(x)h(0)\rangle e^{iq \cdot x} \quad (21)$$

wherein C(q) is surface roughness power spectra, $x=(x, y)$ denote the lateral coordinates of a point on a road surface and $h(x)$ is the height of this point, wherein $q_1$ is the smallest wavelength or lower cut off length of the road surface power spectra and $q_0$ is the largest wavelength or upper cut off length of the road surface power spectra. The surface roughness power spectra C(q) could be provided by measuring the surface of a road. In particular the road surface characteristics can be determined by topometric or optical methods, where diffusive light reflection is used to get the height profile from the road, Further laser scanning methods or mechanical methods could be used to provide a surface roughness power spectra C(q) for a certain road. By changing the used surface roughness power spectra C(q) the development of the μ-slippage curve for different surface roughness grades could be calculated to simulate the behaviour on different roads.

Figure 9:
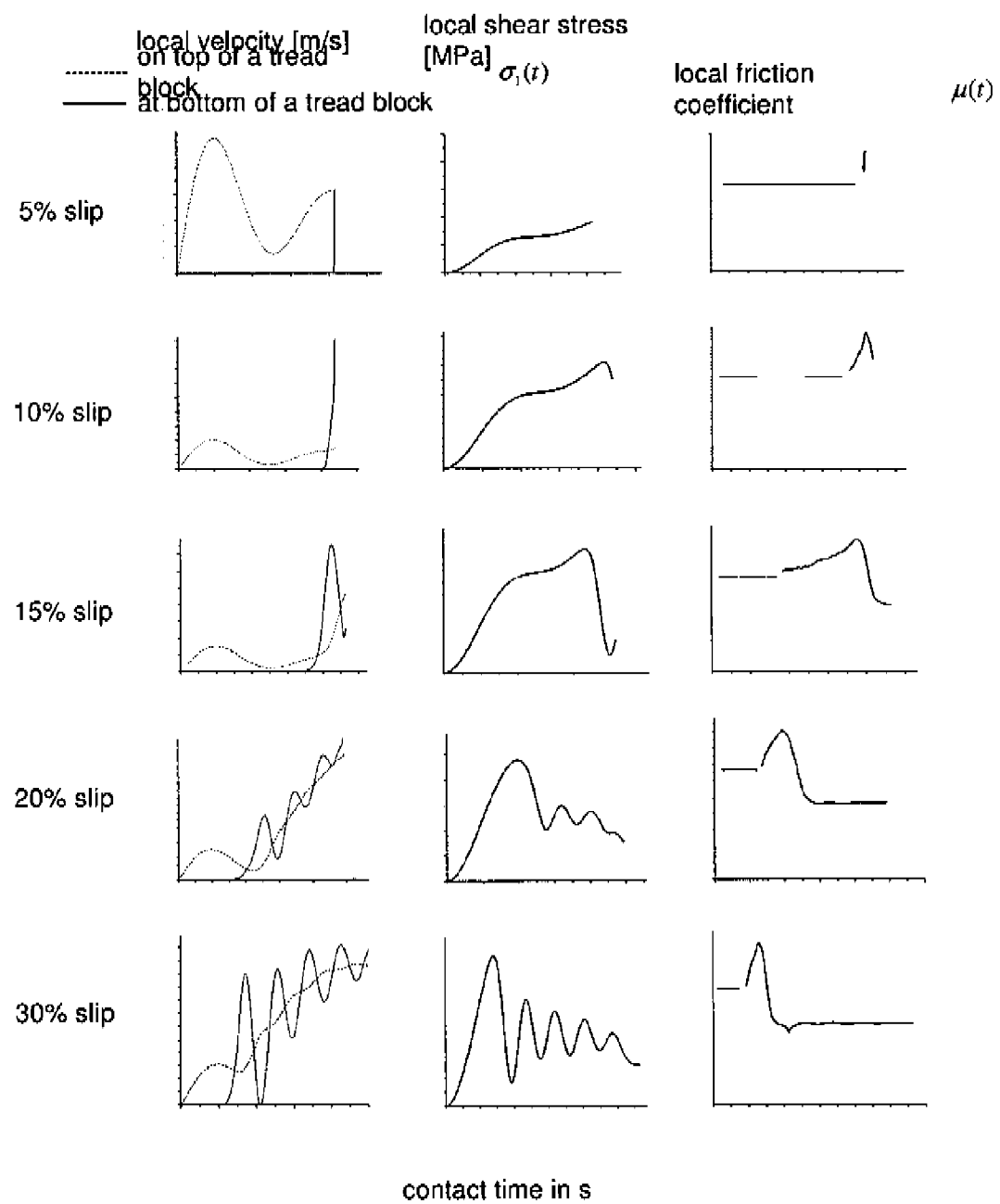
FIG. 9 illustrates an overview of the development of the block velocity and shear stress of a tread block and the resulting μ-slippage curve for several slippage values.

The following illustration, given in FIG. 9, provides an overview for the development of characteristic values for several discrete slip values $s_{slip}$. On the left side of the overview the discrete slippage values $s_{slip}$ are given. The diagrams on the left side represent the development of the local velocity on top $v_{top}$ and at the bottom $v_b$ of a tread block during contact time. The dotted line represents the velocity $v_{top}$ on top of the tread block, wherein the solid line is the velocity at the bottom $v_b$. The diagrams in the middle illustrating the shear stress $\sigma_1(t)$, given in MPa, for the respective slippage values $s_{slip}$ over the contact time t. The right column is representing resulting local friction coefficients μ(t) over the contact time t for the respective slippage values $s_{slip}$. In particular the slippage values $s_{slip}$ of 5%, 10%, 15%, 20% and 30% are given. The illustrated velocities $v_{top}$, $v_b$ and shear stresses $\sigma_1(t)$ are given for a velocity of the car $v_{car}$ of 27 m/s.

In the following a qualitative explanation is given for the slippage values $s_{slip}$ of 10%, 15% and 20%. As can be seen in the velocity diagram for 10% (left side, 2$^{nd}$ row) the velocity $v_{top}$ on top of the tread block is slightly increasing at first and will then decrease with proceeding times. This means the top of tread block is moving at first with increasing velocity, then with decreasing velocity to increase afterwards. After a certain time the tread block will begin to move at its bottom also. Until this time the friction force $F_{0t}(t)$ of the tread block is large enough to withstand the force in x-direction, wherein the x-directions is the direction of the movement of the tire.

The behavior of the tread block could be monitored by the shear stress $\sigma_1(t)$. The shear stress $\sigma_1(t)$ is increasing first until the point in time, where the tread block starts to slide. Since the local friction coefficient μ(t) is the ratio of friction force $F_{0t}(t)$ to the nominal force $F_{Nt}(t)$ the local friction coefficient μ(t) will keep the level as long as the bottom of the tread block does not move. This behavior is also known as sticking of the tread block. When the tread block moves at the bottom its velocity $v_b$ changes and therefore the local friction coefficient μ(t) changes also.

The behavior of the tread block for a slippage value of 15% is different. The sliding velocity at the bottom $v_b$ will increase after a certain time to decrease again. At first the tread block does not move at its bottom to move for a short time and to stick again. The shear stress $\sigma_1(t)$ is increasing first until the point in time, where the tread block starts to slide. As can be seen then the shear stress $\sigma_1(t)$ is building up again slightly. The local friction coefficient μ(t) shows a sticking of the tread block for a shorter time as for a sliding value of 10%. The local friction coefficient μ(t) will increase at first to reach its maximum at the time when the velocity supports the optimum operation field of the compound.

For a slippage value of 20% the velocity at the bottom is varying but constantly increasing. This means the block sticks at first, slips a little bit, sticks again etc. Affected by the flash temperature the movement characteristics change. This could also be noticed for the shear stress $\sigma_1(t)$. The time of sticking is the shortest in comparison to the local friction coefficients for 10% and 15% slippage. The lasting impact of changes in compound properties by the flash temperature effect becomes obvious in the changes in the block movement characteristics. If the contact time would be extended the describing parameter velocity $v_b$, shear stress $\sigma_1(t)$ and friction coefficient μ(t) would come to an equilibrium. The local development of the friction coefficient μ(t) during movement of the tread block through the contact patch can be transferred into a picture on the friction coefficient μ(t) in local position in the driving direction and shows that only half of the tread blocks in the contact line are in optimum operation field.

FIG. 10 illustrates the resulting μ-slippage curves for tire I having a first pressure distribution and tire II having a second pressure distribution B as shown in FIG. 6. As can be seen the friction coefficient increases for both tires I and II in a first part for slippage values below 10%. For tire I a maximum in the friction coefficient is reached in the area of 10% slippage. That means after passing a slippage value of 10% the friction coefficient will decrease. For tire II the μ-slippage curve will reach its maximum later in the area of 15% slippage.

Having this μ-slippage curves it could be concluded that tire I will have a different performance during a braking test.

The μ-slippage curve of tire I will reach its maximum before the maximum of tire II. This means a tire having a pressure distribution of tire II will have a longer braking distance. It could be concluded, that the higher the maximum of the effective friction coefficient the better the braking performance or the shorter the braking distance. This consideration could be applied for straightforward driving. To fine tune the under and over steering the μ-slippage curve could be used also. This will affect the behavior of the car during driving in curves. The μ-slippage curve shows further the quality of interaction of the used rubber compound and the used tire construction. There are compounds which require an adapted tire construction. The inventive method facilitates to get the information of this interaction without producing the whole tire. Further new calculations could be performed easily by changing the characteristic values used for the calculation. So the tire manufacture can fine tune the μ-slippage curve before producing a whole tire resulting in lower costs, broader selection of compounds and constructions. This could be achieved in a drastically reduced time.

Additional advantages and modifications of the present invention will readily occur to those skilled in the art. Therefore, the invention in its broader aspects is not limited to the specific details, representative devices, and illustrative examples shown and described. Accordingly, departures may be made from such details without departing from the scope of the general inventive concept as defined by the appended claims and their equivalents.

List of reference signs

| | |
|---|---|
| 10 | tire |
| 11 | tread block |
| 12 | tire body |
| 13 | rim |
| 14 | road surface |
| 20 | start |
| 21 | set slippage value |
| 22 | calculation of friction force between rubber and road for a tread block at time (t) |
| 23 | calculation of bottom velocity of the tread block and tire body at time (t) |
| 24 | integrate over contact time and averaging over discrete lateral positions |
| 25 | create μ-slippage curve |
| 26 | end |
| 30 | calculating flash temperature Tq(t) |
| 31 | calculating operation point of the compound (Im E'') |
| 32 | calculating real contact area (P(q)) |
| 33 | calculating μ(t) for a tread block |
| 34 | calculating friction force $F_{0i}(t)$ based on μ(t) and $F_{Ni}(t)$ (pressure distribution) |
| 35 | calculating actual operation point of dynamic shear modulus |
| 36 | calculation of velocity of block tread block at the bottom $x_{bottom}$ |
| 41 | big asperity |
| 42 | small asperity |

Input data:

| | |
|---|---|
| RC1 | master curve of a first layer in contact with the road |
| RC2 | horizontal and vertical shifting factors at, bt of a first layer |
| RC3 | heat conductivity λ of a first layer |
| | heat capacity $C_V$ of a first layer |
| | mass density ρ of a first layer |
| LC1 | master curve of a further layer |
| LC2 | horizontal and vertical shifting factors at, bt of a further layer |
| LC3 | heat conductivity λ, heat capacity $C_V$ and mass density ρ of a further layer |
| Temp | actual temperature of the tire |
| P&A | Pressure distribution and contact area |
| Mode | characteristic of the tire body, stiffness $k_C$, damping $γ_C$ |
| Road | surface roughness powerspectra C(q) in dependence on the wavenumber q |
| Car | velocity v of a car |
| $λ_o$ | distance between the peaks of the asperities |
| h | height of asperities |
| ξ | magnification factor |
| $T_0$ | background temperature |
| $s_{slip}$ | Slippage value |
| μ(t) | local friction coefficient |
| $μ_{slip}$ | effective friction coefficient |
| $A_0$ | nominal contact area |
| C(q) | surface roughness power spectra |
| D | heat diffusivity |
| ε | shear strain |
| $F_0$ | friction force |
| $F_1$ | shear force |
| $F_N$ | nominal force |
| G | complex shear modulus |
| $γ_C$ | damping factor of the tire body |
| $k_C$ | spring constant of the tire body, stiffness |
| $L_z$ | block height |
| $M_c$ | mass of tire body |
| ν | poisson's ratio |
| P(q) | real contact area |
| q | wave number, frequency |
| $q_0$ | upper cut off length of the road surface power spectra, largest wavelength |
| $q_1$ | lower cut off length of the road surface power spectra, smallest wavelength |
| $σ_0$ | nominal pressure |
| $σ_1$ | shear stress |
| t | contact time |
| t' | preceding point in time t' ≦ t |
| $x_0$ | position of rim |
| $x_{bottom}$ | position of the centre of the tread block at time t at surface to the road |
| $x_{top}$ | position of the centre of the tread block at time t at interface to the tire body |
| $v_{car}$ | velocity of the car |
| $v_{tire}$ | velocity of the tire |
| $v_b$ | sliding velocity at bottom of a tread block |
| E | complex dynamic modulus |
| E' | real part of E, storage modulus |
| E'' | imaginary part of E, loss modulus |
| λ | heat conductivity in W/mK, |
| $C_v$ | heat capacity in J/K |
| ρ | mass density |
| at | horizontal shifting factor |
| bt | vertical shifting factor |

The invention claimed is:

1. A method for outputting a μ-slippage curve for a tire comprising the steps:
    calculating a friction force between a rubber compound and a rough surface based on a development of a friction coefficient during a contact time and lateral positions of the tire;
    calculating the friction coefficient depending on a sliding velocity between the rough surface and a tread block and on a temperature of the tire;
    calculating a motion of the tread block depending on a pressure distribution during movement of the tread block through a contact area and on characteristics of a tire body;
    calculating effective μ-slippage values for different slippage values based on the friction force and a nominal force; and
    outputting a μ-slippage curve based on the effective μ-slippage values for different slippage values via an output device.

2. The method as claimed in claim 1, wherein temperature is calculated based on a friction induced temperature increase.

3. The method as claimed in claim 1, wherein the step of calculating the friction coefficient further comprises: calculating a real contact area of the tread block depending on the frequency between the rough surface and tire and on the friction induced temperature increase of the tire.

4. The method as claimed in claim 1, wherein the step of calculating the friction coefficient further comprises:
    providing compound characteristics of the tread block;
    providing a complex dynamic modulus including a real part and an imaginary part of the modulus; and
    providing a power spectra of the rough surface.

5. The method as claimed in claim 1, wherein the step of calculating the friction coefficient comprises:

calculating the friction coefficient depending on preceding characteristic values.

6. The method as claimed in claim 1, wherein the tire characteristic values comprise stiffness and damping values.

7. The method as claimed in claim 4, wherein the step of providing the complex dynamic modulus comprises:

measuring the complex dynamic modulus within a limited frequency range and generating a master curve showing the dependency of the complex dynamic modulus over the frequency in a wide range by using a super position principle; and providing shifting factors at a vertical shifting factor.

8. The method of claim 7, wherein the limited frequency range is 0.1 to 100 HZ.

9. The method as claimed in claim 1, comprising calculating a μ-slippage curve for tire characteristic values of further compound layers used for the tread block.

10. The method as claimed in claim 9, wherein the tire characteristic values comprise master curve of a further layer, horizontal and vertical shifting factors at a vertical shifting factor of a further layer or heat conductivity, heat capacity and mass density of a further layer.

11. The method as claimed in claim 1, wherein a power spectra of the rough surface is provided by measuring the surface of the rough surface by optical sensitive sensors.

12. The method as claimed in claim 1, wherein pressure distribution of a tire is provided by measuring the pressure on a surface by means of pressure sensitive sensors.

13. A computer program containing a program code to carry out the steps of the method of claim 1, when said program code is capable of running on a computer.

14. A computer program containing a program code to carry out the steps of the method of claim 1, wherein said program code is capable of being stored on a data carrier.

* * * * *